United States Patent [19]

Van Gasse et al.

[11] Patent Number: 5,212,234

[45] Date of Patent: May 18, 1993

[54] MOULDING COMPOUND BASED ON THERMOSETTING RESIN MATERIAL

[75] Inventors: Rene L. E. Van Gasse, Opglabbeek, Belgium; Andreas N. J. Verwer, Beek, Netherlands

[73] Assignee: DSM Resins B.V., Zwolle, Netherlands

[21] Appl. No.: 689,508

[22] Filed: Apr. 23, 1991

Related U.S. Application Data

[63] Continuation of Ser. No. 345,850, May 1, 1989, abandoned, which is a continuation of Ser. No. 122,596, Nov. 12, 1987, abandoned, which is a continuation of Ser. No. 850,158, Apr. 10, 1986, abandoned.

[30] Foreign Application Priority Data

Apr. 11, 1985 [NL] Netherlands .......................... 8501059

[51] Int. Cl.$^5$ .............................................. C08L 67/06
[52] U.S. Cl. ........................................ 525/43; 525/28; 525/30; 525/31; 525/32; 525/44; 523/527
[58] Field of Search ........................ 525/44, 43, 10, 27; 523/527

[56] References Cited

U.S. PATENT DOCUMENTS

| | | | |
|---|---|---|---|
| 2,952,576 | 9/1960 | Wheelock | 525/44 |
| 3,780,141 | 12/1973 | Jin et al. | |
| 3,926,902 | 12/1975 | Bowen | 525/44 |
| 3,933,728 | 1/1976 | Henbest | 523/527 |
| 4,027,849 | 5/1977 | Jin et al. | |
| 4,049,747 | 9/1977 | Jin et al. | |
| 4,062,826 | 12/1977 | Hutchinson | 523/527 |
| 4,086,203 | 4/1978 | Shaw | 523/527 |
| 4,260,538 | 4/1981 | Iseler et al. | |
| 4,289,684 | 9/1981 | Kallaur | 523/527 |
| 4,296,020 | 10/1981 | Magrans | 525/44 |
| 4,349,601 | 9/1982 | Brueggemann et al. | |
| 4,468,485 | 8/1984 | Gourdenne et al. | |

Primary Examiner—Patricia A. Short
Attorney, Agent, or Firm—Cushman Darby & Cushman

[57] ABSTRACT

The invention relates to a moulding compound based on thermosetting resin material and optionally fibers, fillers, curing catalysts and further usual additives, and is characterized in that the moulding compound comprises a mixture of at least two thermosetting resins of which a first resin is in a partly cured state, and of which a second resin is not, or less than the first resin in a partly cured state.

9 Claims, No Drawings

MOULDING COMPOUND BASED ON THERMOSETTING RESIN MATERIAL

RELATED APPLICATIONS

This is a continuation of U.S. application Ser. No. 07/345,850 filed on May 1, 1989 now abandoned, which was a continuation of Ser. No. 07/122,596 filed on Nov. 12, 1987 now abandoned, which was a continuation of U.S. application Ser. No. 06/850,158 filed on Apr. 10, 1986 now abandoned.

FIELD OF THE INVENTION

The invention relates to a moulding compound based on thermosetting resin material, optionally fibres, fillers and curing catalysts and further usual additives.

BACKGROUND OF THE INVENTION

Moulding compounds based on thermosetting material are, for instance, Sheet Moulding Compounds (SMC), Bulk Moulding Compounds (BMC), Dough Moulding Compounds (DMC) and free-flowing solid moulding compounds, such as moulding powders, moulding granulates or moulding flakes, etc.

Related processing techniques are known from the Kunststoffhandbuch, volume 8, Polyester by Vieweg and Goerden, pages 482, 491 and 495 and from the papers read during the '13th Offentliche Jahrestag der Arbeitsgemeinschaft Verstärkte Kunststoffen' held at Freudenstadt from Oct. 5th till 7th 1976.

These moulding compounds can be processed by injection moulding, transfer moulding, compression moulding, pulltrusion, combinations of injection moulding and compression moulding, etc.

In the application of such moulding compounds great value is attached to the non-porousness and smoothness of the surface. The automobile industry, for instance, makes demands on the non-porousness and smoothness of the surface, which must at least come up to the quality of steel. At the same time the costs of the proposed solutions for the surface problems must also be dealt with, since these must not be too high. There must be no fibres, e.g. glass fibres, direct at the surface of moulding compounds that must conform with high standards in respect of the surface.

SUMMARY AND OBJECTS OF THE INVENTIONS

The object of the invention is to provide a moulding compound based on a thermosetting resin material, optionally fibres, fillers and curing catalysts and further usual additives, resulting in mouldings having a non-porous and smooth surface.

The moulding compound according to the invention is characterized in that the moulding compound comprises a mixture of at least two thermo-setting resins of which one resin is in a partly cured state, and of which a second resin is not, or less than the first resin in a partly cured state.

A resin in a partly cured state is also called a 'B-stage' resin.

DESCRIPTION OF THE INVENTION

According to a preferred embodiment of the invention the mixture contains a partly cured resin with a viscosity higher than 50,000 Pas (measured at 20° C.) and another resin with a viscosity lower than 100 Pas (measured at 150° C.).

The viscosities are measured with a Brookfield viscometer (type HBT).

The viscosity of the partly cured resin is preferably between 50,000 and 1,000,000 Pas, while the viscosity of the second resin is between 0.5 and 100 Pas.

According to a further preferred embodiment the viscosity of the partly cured resin is between 100,000 and 500,000 Pas and the viscosity of the second resin between 1 and 10 Pas.

The proportion of the components of the moulding compounds may vary within wide limits, depending on the ultimate use. According to a preferred embodiment the two thermosetting resins are used in a weight ratio between 5:95 and 95:5.

According to a further preferred embodiment the two thermosetting resins are used in a weight ratio between 1:4 and 4:1.

In case the moulding compound comprises fibres, the fibres are preferably applied in the resin that is in the higher partly cured state. Preferably glass fibres are applied.

According to a specific embodiment the invention the moulding compound consists of free-flowing ('rieselfähige') solid particles. This moulding compound preferably consists of a mixture consisting of free-flowing solid particles of partly cured thermosetting resin with fibre, preferably glass fibre, and optionally with fillers and further usual additives and of free-flowing solid particles of a powdery thermosetting resin with optionally fillers, curing catalysts and further usual additives with a viscosity lower than that of the particles of the partly cured thermosetting resin.

Preferably the powdery thermosetting resin with optionally fillers, curing catalysts and further usual additives has a higher curing reactivity than the partly cured thermosetting resin with fibres, and with optionally fillers and further usual additives.

The curing reactivity can be determined by the method described in 'SPI-procedures for running exotherm curves-polyester resins', (September 1960) and is expressed in minutes or seconds.

According to another specific mode of the invention the moulding compound has the form of an SMC, BMC, DMC, moulding powders, moulding granulates or moulding flakes, the matrix of the compound consisting mainly of partly cured thermosetting resin with fibres, preferably glass fibres and optionally fillers and further additives, which is dispersed into a quantity of a thermosetting resin having a lower viscosity.

The thermosetting resins that can be applied are preferably alkenically unsaturated, crosslinkable polyesters, epoxy resins, resol resins, saturated polyester resins, melamine resins, acrylate resins, polyurethane resins, diallyl phthalate resins alone or combined and whether or not in combination with alkenically unsaturated monomers and/or prepolymers.

By preference, alkenically unsaturated, crosslinkable polyesters, epoxy resins, acrylate resins, diallylphthalate resins alone or combined, in combination with alkenically unsaturated monomers and/or prepolymers are applied.

Examples of alkenically unsaturated crosslinkable polyesters are polycondensation products of polyvalent alcohols, such as propylene glycol, ethylene glycol, diethylene glycol, pentanediol, butanediol, butylene glycol, diproplene glycol and polyvalent unsaturated acids like maleic acid, phthalic acid, itaconic acid, isophthalic acid, adipic acid and fumaric acid or acid-forming anhydrides hereof.

Examples of alkenically unsaturated monomers are styrene, substituted styrenes such as vinyltoluene or tert.butylstyrene, ($C_2$-$C_4$)-alkylesters of acrylic acid and methacrylic acid, α-methyl styrene, cyclic acrylates and methacrylates, halogenated styrenes, 1-3-butanedioldimethacrylate and diallyl phthalate.

According to a preferred mode of the invention a mixture of a. a partly cured resin based on an alkenically unsaturated crosslinkable polyester, and b. a solid resin based on an alkenically unsaturated crosslinkable polyester optionally in combination with a solid monomer with at least two alkenic unsaturations per molecule and/or a prepolymer thereof can be used.

Solid resin is understood to mean a resin solid at room temperature, based on for instance the said alkenically unsaturated bondable polyester. Crystalline resins in particular are very suitable.

Examples of solid monomers with at least two alkenic unsaturations per molecule are triallyl cyanurate, triallyl isocyanurate and epoxy acrylates.

For the purpose of obtained special effects in respect of the physical properties the glass fibre can optionally be replace in whole or in part by carbon fibre, sisal, jute, asbestos, cotton, organic synthetic fibres, such as polyamide, polyester, polypropylene or polyethylene, inorganic fibres such as quartz and beryllium and other metal fibres. The fibres may be present also in the form of continuous fibres or of a fibre mat, which is kept together by a suitable bonding agent, or in the form of chopped continuous filaments without binding agent. The length of the fibres used, particularly of the glass fibres, may range from 0.5 mm to 50 mm.

The fibre may be added in amounts of up to 80% (wt) (calculated on the total compound).

The fillers that can be used may be, for instance, marl, antimony trioxide, silica flour, coconut shell flour, talcum, calcium carbonate, silicon oxide, clay, calcium silicate, wood flour, glass beads, titanium dioxide, aluminium silicate, aluminium hydrate, carbon black or gypsum anhydrite. The filler content incorporated may range from 5 to 70% (wt).

The catalyst applied may be, for instance, tert.butylperbenzoate, benzoyl peroxide, tert.butylperoxide, tert.butylperoctoate, di-tert.butylperoctoate, cyclohexanone peroxide, methylethylketone peroxide, acetylacetone peroxide or lauroylperoxide. Inhibitors, too, are often used to provide sufficient stability of the moulding compound at ambient temperature before the moulding process. The inhibitors also leave enough time for the flowing into the mould before the gelling commences. Examples of such inhibitors are hydroquinone and p-benzoquinone.

Examples of accelerators are octoates, naphthenates and amines, such as cobaltoctoate, dimethylaniline, diethylaniline and dimethyl paratoluidine.

Other additives are, for example, release agents such as the stearates of zinc, calcium or aluminium, phosphates, silicons, polyvinylalcohol and waxes.

Further, usual low-profile additives such as, for instance, thermoplastics, can be added. Examples of thermoplastics are homopolymers of methylmethacrylate, ethylmethacrylate and butylmethacrylate, methylacrylate and ethylacrylate, styrene, copolymers of methylmethacrylate and other low-molecular weight alkylacrylates and alkylmethacrylates and copolymers of methylmethacrylate with small amounts of one or more of the following monomers: laurylmethacrylate, isobornylmethacrylate, acrylamide, hydroxyethylmethacrylate, styrene, 2-ethylhexylacrylate, acrylonitrile, methacrylic acid, methacrylamide, methylolacrylamide and cetylstearylmethacrylate, copolymers of styrene and acrylonitrile, copolymers of vinylchloride and vinylacetate, cellulose acetatebutyrate, cellulose acetateproprionate and styrene maleic anhydride copolymer.

The moulding compounds can be thickened physically or chemically with usual thickeners such as, for instance, with metal oxides such as magnesium oxide or with metal hydroxides.

Further, the usual pigments or colourants can be added.

The invention can be performed in a lot of different ways, of which some will be described here, without limiting the scope of the invention.

A first, partly cured resin can e.g. be prepared by impregnation of one or more glass fleeces, after which the resin is partly cured by applying electron beam radiation or by curing with the aid of an U.V. sensitive catalyst system and U.V. Light. Another method is heating the resin or by exposing the resin to I.R. radiation in order to heat the resin, and initiate the curing with a catalyst that is very sensitive to heat, e.g. hydrogen peroxide. The resulting sheet is chopped to particles with a length of e.g. 0:5 mm to 5 cm and with a width of e.g. 0.5 mm to 0.5 cm. So, the ultimate partly cured resin consists of dry rubbery particles that show a very good stability in time. Thus, they can be retained on stock for over ½ year at 20°-24° C. without further curing. When applying these particles in a mould, still some flowing of the resin is seen. In an analogous way, glass fibres can be put through a bath with thermosetting resin and after that the resin can be cured partly, with e.g. U.V. radiation. The coated fibre can be chopped to particles with a length of 0.5 mm-5 cm.

A second polyester is applied e.g. as follows. The particles of partly cured resin with glass fibre, are coated with a crystalline resin with a melting point of 70° C. in a bath in which such a melted resin is present. After cooling, by e.g. air, dry, free flowing particles are obtained, with very good keeping stability. In a second way, the second thermosetting resin comprises a crystalline unsaturated polyester, and a mixture of a normal unsaturated polyester with styrene. Such a mixture has a wax-like performance at room temperature. The partly cured particles are dispersed in such a second resin mixture and the resulting mixture is easily applied as a BMC or DMC. Otherwise, a common thermosetting polyester is used, which is thickened with MgO paste, after coating the particles or partly cured resin with such a common resin.

Furthermore it is possible, to use a mixture of partly cured resin with glass fibres and an unsaturated polyester together with MgO in making an SMC, by applying the mixture on a polyethylene sheet, as long as the second resin is fluid, and let the sheet thicken. The first and the second thermosetting resin comprises among other additives, a catalyst system, by which the mixture can be used in a final cure.

Using the moulding compounds according to the invention, it is possible to make moulded articles with a smooth surface and without pores. Surfaces can be obtained equalling those obtained in the painting of steel. The physical properties of the moulded articles obtained with the moulding compounds according to the invention are also excellent.

The moulding compounds according to the invention can be used in the automobile industry, as moulded articles for open-air application, office equipment, etc.

The invention is further elucidated by means of the following example without, however, being limited thereto.

EXAMPLE

Resin A: A resin compound A is composed as follows:

---

60 parts by weight unsaturated polyester resin as 60% solution in styrene (Synolite TP 846-VG, DSM Resins)
40 parts by weight polyvinylacetate as 40% solution in styrene
150 parts by weight calcium carbonate
3 parts by weight titanium dioxide
3.8 parts by weight magnesium oxide
100 ppm parabenzoquinone
1.25 parts by weight tertiary butylperbenzoate
0.1 parts by weight cobaltoctoate (1%)
77 parts by weight glass fibres (25 mm)

---

Resin B: Resin A was partly cured with hydrogen peroxide.

The viscosity of this resin compound (measured at 20° C. with a Brookfield viscometer type HBT) without glass fibre after 24 hours is 120,000 Pas.

Resin C: Resin compound C is obtained by mixing:

---

100 parts by weight crystalline polyester resin (Synolite PR 7561, DSM Resins)
3 parts by weight triallylcyanurate
5 parts by weight titanium dioxide
1.5 parts by weight tertiary butylperbenzoate
3 parts by weight zinc stearate

--- in the melt at 80° C., while after incorporation of the catalyst tertiary butylperbenzoate the mixture is rapidly cooled.

The viscosity of this resin compound is 1.6 Pas (measured at 150° C. with a Brookfield viscometer type HBT).

Subsequently, after the preparation of a resin compound B resin compound C is added in such a weight that the mixing ratio between resin compound B and resin compound C is 7:3.

Moulded articles with a moulding compound based on resin compound A and resin compound B show virtually no pores and have an excellent smoothness of the surface.

COMPARATIVE EXAMPLE the surface of a moulded article based on resin compounds A or B, were porous.

We claim:
1. The molding compound comprising:
   a mixture of at least two thermosetting resins, the first resin being partially cured to a viscosity greater than 50,000 Pas at 20° C. by radical polymerization, the second resin having a viscosity less than 100 Pas at 150° C., said thermosetting resins consisting essentially of
   (a) alkenically unsaturated crosslinkable polyesters, in combination with
   (b) alkenically unsaturated monomers, alkenically unsaturated prepolymers, or mixtures of alkenically unsaturated monomers and prepolymers, said first resin containing fibers and the particles of said first resin being dispersed in said second resin.
2. The molded object having a smooth non-porous surface comprising the cured molding compound according to claim 1.
3. The molding compound according to claim 1, wherein the viscosity of the partially cured resin is between 50,000 and 1,000,000 Pas (measured at 20° C.); and the viscosity of the second resin is between 0.5 and 100 Pas (measured at 150° C.).
4. The molding compound according to claim 1, wherein the viscosity of the partially cured resin is between 100,000 and 500,000 Pas (measured at 20° C.) and the viscosity of the second resin is between 1 and 10 Pas (measured at 150° C.).
5. The molding compound according to claim 1, wherein the molding compound consists of free-flowing solid particles.
6. The molding compound according to claim 1, wherein the said mixture:
   (a) said partially cured resin is based on an alkenically unsaturated monomer and an alkenically unsaturated crosslinkable polyester, and
   (b) the second resin is a solid alkenically unsaturated, crosslinkable polyester.
7. The molding compound according to claim 1, wherein the partially cured resin has lower curing reactivity than the second resin.
8. The molding compound according to claim 1, wherein said compound comprises a physically or chemically thickened mixture in the form of a sheet molding compound, a dough moulding compound or bulk moulding compound.
9. The molding compound according to claim 1, wherein said solid second resin is based on an alkenically unsaturated, crosslinkable polyester and:
   (i) a solid monomer having at least two alkenic unsaturations per molecule,
   (ii) a prepolymer thereof, or
   (iii) a solid monomer having at least two alkenic unsaturation per molecule and a prepolymer thereof.

* * * * *

UNITED STATES PATENT AND TRADEMARK OFFICE
CERTIFICATE OF CORRECTION

PATENT NO. : 5,212,234

DATED : May 18, 1993

INVENTOR(S) : VAN GASSE et al.

It is certified that error appears in the above-identified patent and that said Letters Patent is hereby corrected as shown below:

ON THE TITLE PAGE item [63], Related U.S. Application Data, please change "122,596" to --122,546--.

Column 1, line 9, change "07/122,596" to --07/122,546--.

Signed and Sealed this

Tenth Day of October, 1995

Attest:

BRUCE LEHMAN

*Attesting Officer*  *Commissioner of Patents and Trademarks*